March 15, 1927.
R. H. LEWIS
1,621,211
SELECTIVE FOUR-WHEEL DRIVE AND STEERING AND BRAKE MECHANISM FOR AUTOMOBILES
Filed Feb. 20, 1923   3 Sheets-Sheet 1
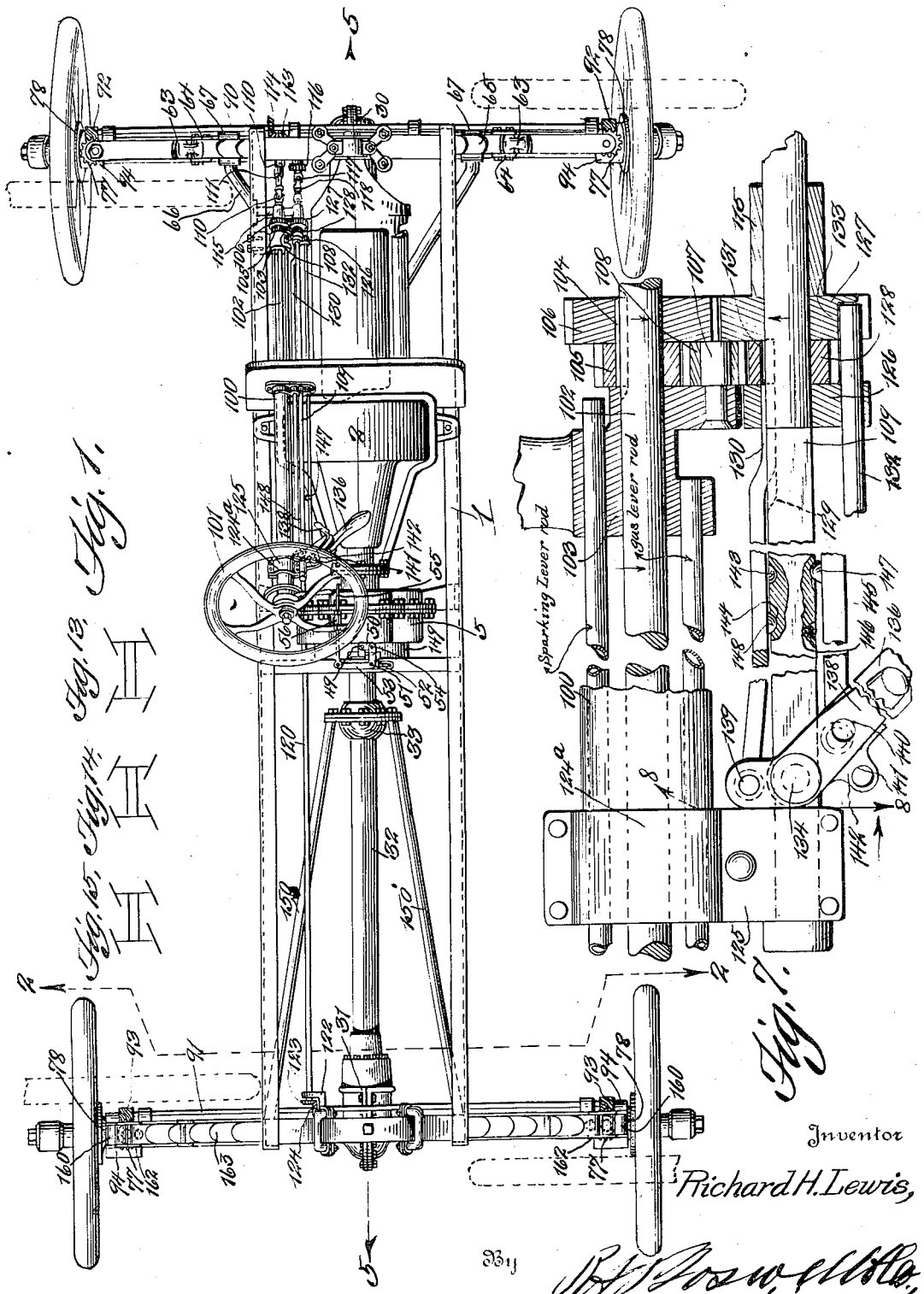
Inventor
Richard H. Lewis, March 15, 1927. 1,621,211
R. H. LEWIS
SELECTIVE FOUR-WHEEL DRIVE AND STEERING AND BRAKE MECHANISM FOR AUTOMOBILES
Filed Feb. 20, 1923  3 Sheets-Sheet 2
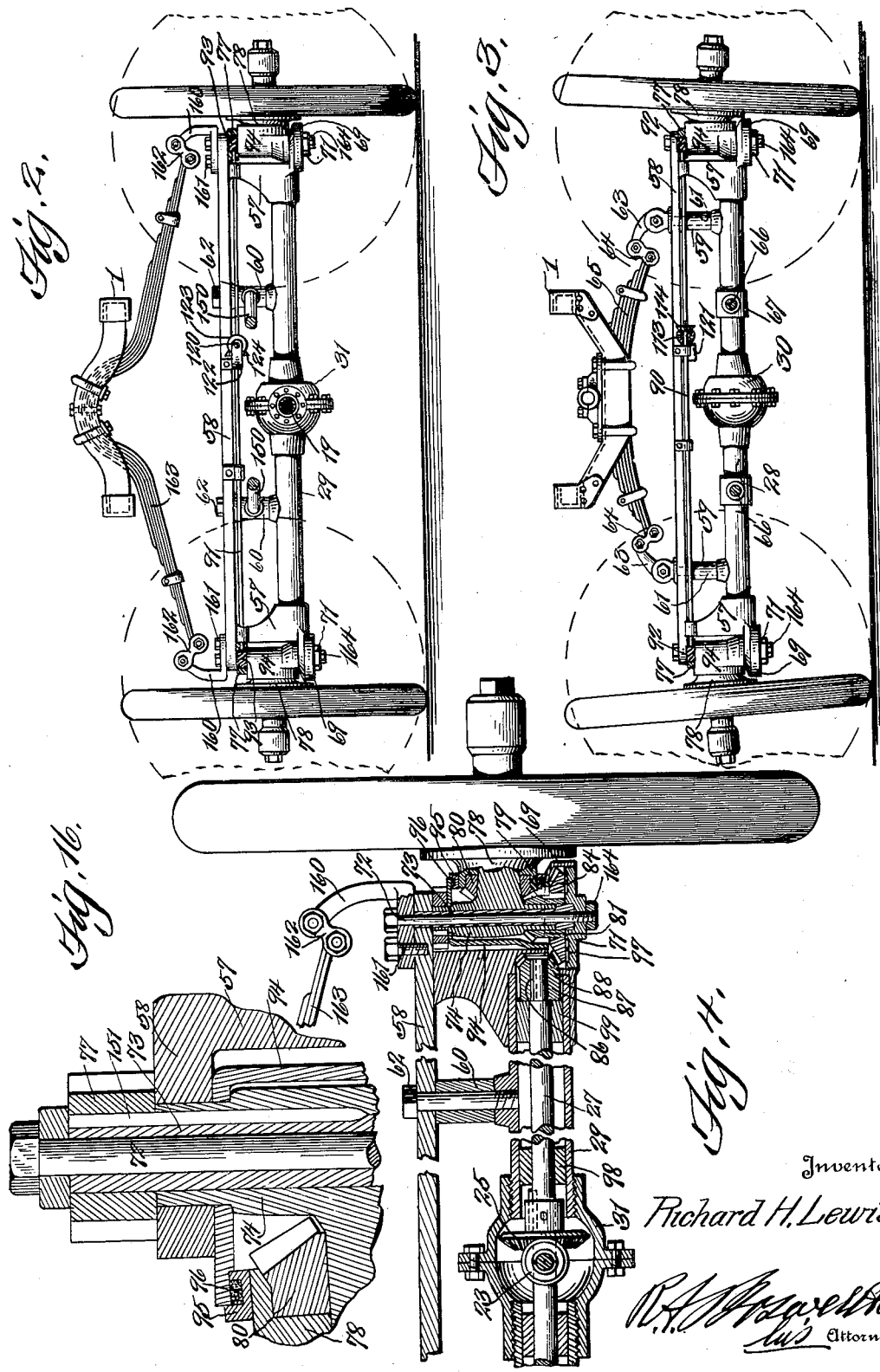

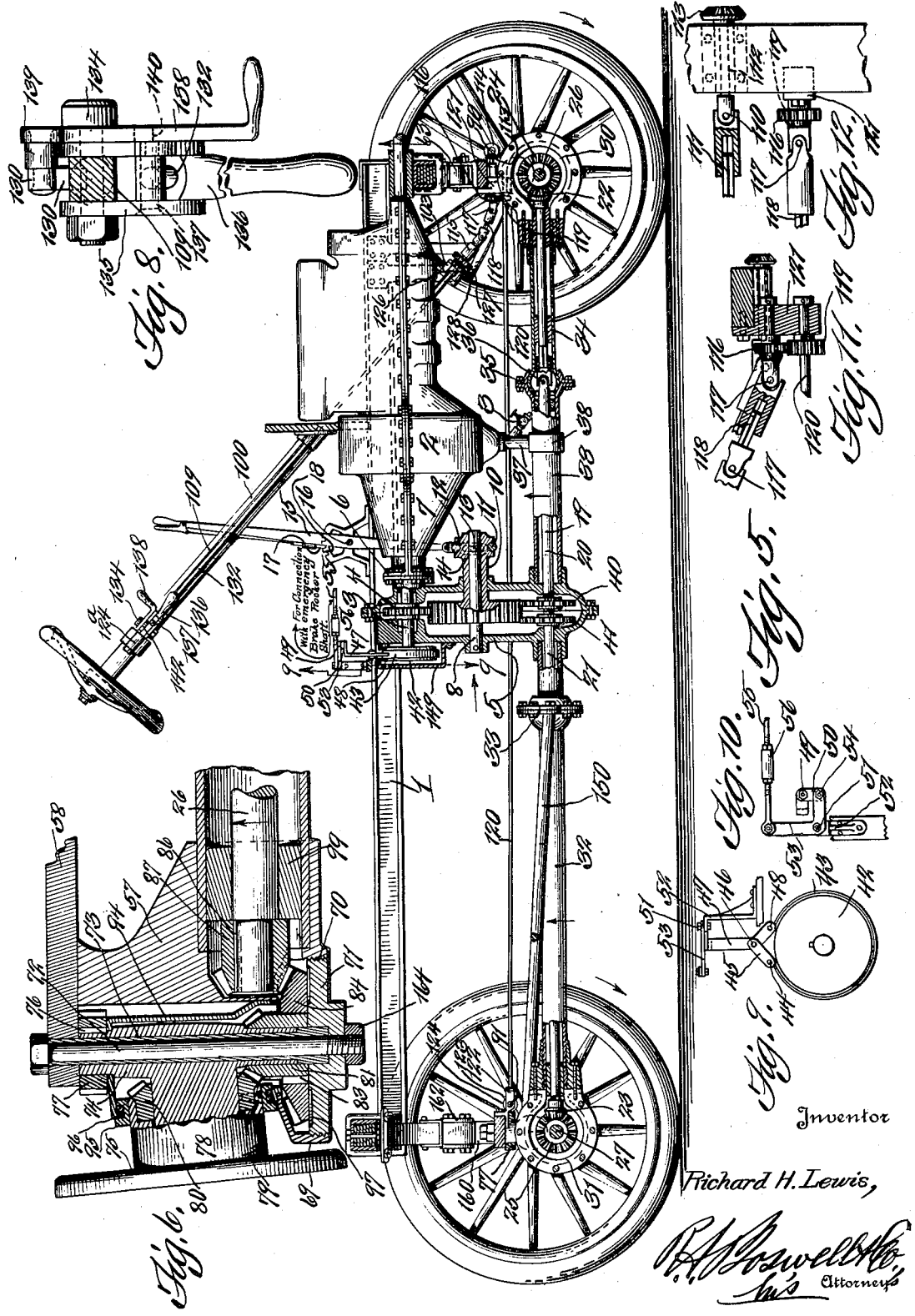

Patented Mar. 15, 1927.

1,621,211

UNITED STATES PATENT OFFICE.

RICHARD H. LEWIS, OF RIVERDALE, MARYLAND.

SELECTIVE FOUR-WHEEL DRIVE AND STEERING AND BRAKE MECHANISM FOR AUTOMOBILES.

Application filed February 20, 1923. Serial No. 620,193.

Frequently, on rough, slippery and irregular road-beds, and on crowded streets, it is very difficult to steer, drive and park motor-driven vehicles, such as automobiles, trucks, tractors and the like. Very often on slippery and rough road-beds it is difficult to drive the rear wheels, and very easy for the front wheels to take hold, provided they could be driven. The same thing is true with regard to steering. For instance it has been found inconvenient to properly steer the front wheels of a motor-driven vehicle, and more convenient to steer the rear wheels, provided such could be accomplished. Also on crowded streets motor-driven vehicles could be parked where there may be spaces or room just sufficient to receive the length of an automobile or other motor driven vehicle, but owing to the necessity of shifting the vehicle back and forth and side-wise to enable the chauffeur to park the vehicle in the space, it is impossible to park the vehicle in its proper position.

It is therefore the purpose of the present invention to provide mechanisms for vehicles of this character, for selectively steering the front and rear wheels and selectively driving said wheels enabling the vehicle to be easily driven and steered on slippery and rough road-beds and where parking spaces occur.

Another purpose is to provide a counter driving shaft operatively connected with the engine or motor shaft and operatively connected with the front and rear wheels (which are capable of turning upon arcs of 180 degrees), for selectively driving either set of wheels or both thereof.

Still another purpose is to provide an improved mounting for each wheel, whereby it may be driven by a drive axle operatively connected therewith, with means operatively connected with the hub spindle, so that the wheel may move upon an arc of 180 degrees. For instance, should the wheel be traveling in a direction straight ahead, the wheel, while being driven, may be swung to the right or the left a full 90 degrees, in other words, at right angles to the drive axle.

With mechanisms of this character a chauffeur is enabled to more easily extricate the vehicle from close spaces upon slippery and rough road-beds, as well as to easily park and to remove vehicles from parking spaces.

A further purpose is the provision of means operatively connecting the motor or engine driving shaft and the counter wheel driving shaft (which consists of two sections), in order to selectively drive either or both sections of said counterdrive shaft enabling the chauffeur to drive either set of wheels or both thereof.

A still further purpose is the provision of a steering mechanism, which is capable of steering either set of wheels, or so that the rear wheels may be steered in the same direction with the front wheels or in an opposite direction and vice versa. This character of steering mechanism will enable the chauffeur to bring the vehicle adjacent parking room or space (which may be just sufficient for the length of the vehicle), whereupon both sets of wheels may be turned at right angles to their drive axles, in other words, a swing of 90 degrees either to the right or to the left, enabling the vehicle to be driven sidewise in the parking space.

Additionally it is the aim to provide a steering mechanism for selectively steering either set of wheels including means for locking said mechanism, thereby preventing an unauthorized person from manipulating the vehicle.

Also the invention aims to afford means for holding the rear wheels in positions to travel straight ahead, whereby the vehicle may be operated in the ordinary manner, in other words, so that the front wheels may be turned in either direction.

In order to permit the wheels to freely rotate and to be steered in either direction, the knuckle drive joint between the hub spindle and the drive axle is encased in an oil housing such as will receive lubricant of any character.

In applying mechanisms of this character it has been found best to brake the motor or engine shaft, and since this shaft is connected operatively with either or both of the sections of the counterdriving shaft, it is possible to brake either or both sets of wheels.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:

Figure 1 is a plan view of the chassis or frame of an automobile showing the improved selective drive and steering mechanism applied.

Figure 2 is a sectional view on line 2—2 of Figure 1 showing the rear mountings for the rear wheels.

Figure 3 is a view in front elevation of the chassis or frame showing the drive and steering mountings for the front wheels.

Figure 4 is an enlarged detail sectional view of the rear driving and steering mounting of one of the rear wheels.

Figure 5 is a longitudinal sectional view on line 5—5 of Figure 1 showing certain of the parts of the vehicle in elevation and certain other of said parts in section.

Figure 6 is an enlarged detail sectional view of the driving and steering mounting of one of the front wheels.

Figure 7 is an enlarged detail view of the selective steering mechanism for all four wheels.

Figure 8 is a sectional view on line 8—8 of Figure 7.

Figure 9 is a view taken on line 9—9 of Figure 5, showing the improved band brake for the fly wheel of the engine or motor shaft.

Figure 10 is a plan view of the means for tightening the band brake, in other words, for operating same.

Figure 11 is an enlarged detail sectional view of a connection which operatively connects the steering means with a shaft which in turn steers the rear wheels of the vehicle.

Figure 12 is a plan view of a means which connects the steering mechanism with the front and rear wheels.

Figures 13, 14 and 15 are diagrammatic views showing the front and rear wheels in different positions, whereby the vehicle may be easily manipulated.

Figure 16 is a sectional view of a portion of steering and driving mounting of one of the wheels, showing a modified construction.

Referring to the drawings 1 designates the frame or chassis of a motor-driven vehicle, and while the improved mechanisms are shown as applied to a Ford construction of an automobile, it is equally adapted for use in connection with all other makes of vehicles. In fact the invention is applicable to automobiles, trucks, tractors and the like.

The usual motor block or engine casing 2 is conveniently supported upon the frame or chassis in the usual manner, and carried by the engine or motor shaft 3 is a spur gear 4, which is housed in an oil casing 5, which in turn is bolted or otherwise secured at 6 to the usual transmission casing 7 of the motor block or engine casing. The gear 4 is keyed to the engine shaft, and the casing 5 is constructed in two sections bolted together as shown, and to enable the same to be assembled and disassembled. A shaft 8 is fixed in any suitable manner in the oil housing or casing 5, and axially slidable thereon is a broad spur gear 9, which is permanently in mesh with the gear 4. The gear 9 has an axially arranged hollow or tubular shaft 10, which slides through a bearing of the oil housing or casing 5. A suitable split ring 11 is mounted in a groove 12 of one end of the hollow shaft or sleeve 10 and is provided with diametrically opposite pins 13, which are engaged by the slotted forks 14 of a lever 15, which is pivotally supported at 16 on the frame of the vehicle. The lever 15 has the usual hand grip operated dog 17 for engagement with teeth of a rack 18, for holding the lever 15 in different position. Obviously this lever is provided for the purpose of shifting the gear 9. Any other conventional means may be employed for this purpose.

In order to apply the present four wheel driving and steering mechanism the usual drive shaft casing as well as the shaft, is dispensed with, and in lieu thereof a counter driving shaft 19 is provided. This shaft 19 consists of two sections 20 and 21 which are axially alined. The forward and rear ends of the counter drive shaft 19 have pinions 22 and 23 meshing with beveled gears 24 and 25 which are carried by the forward and rear drive axles 26 and 27, which are mounted in the usual forward and rear axle casings 28 and 29. These forward and rear axle casings also include the usual housings 30 and 31 for the beveled gears and pinions 24 and 25 and 22 and 23.

A tubular casing or housing 32 is provided for the counter drive shaft and its forward and rear ends are connected in the usual manner to the gear housings 30 and 31. This tubular casing or housing 32 comprises the intermediate and end sections 33 and 34, which are connected by conventional universal joints 35. Where these joints 35 occur the counterdrive shaft is provided with universal joints, such as shown at 36, enabling the shaft to accommodate the vibrations of the automobile or vehicle chassis. In applying the counterdrive shaft and its tubular casing, it is necessary to remove the usual oil drain plug, which is carried by the lower extremity of the forward portion of the transmission case. In lieu of the oil drain plug, the application of the counterdriving shaft housing or casing necessitates a suitable support 37, which is connected to the lower forward portion of the transmission case. The support 37 has a bearing 38 for the tubular casing. The support 37 is also hollow and has a laterally downwardly disposed oil drain top or plug 39, as a substitution for the usual oil drain plug. The adjacent extremities of the sections 20 and 21 of the counterdrive shaft have keyed thereto in any suitable manner gears 40 and 41, with which the gear 9 meshes. Obviously, the gear 9 may be shifted axially upon its supporting shaft 8 so that either of the gears 40 and 41 may be driven. Under either of these circumstances the gear 9 remains in mesh with the gear 4, therefore either set of wheels may be driven. However, as long as the gear 9 remains in mesh with both gears 40 and 41, all four wheels of the vehicle may be driven.

Mounted to rotate with the motor or engine shaft is a fly wheel 42, with which a brake band 43 cooperates. This brake band at one end is mounted upon a stud 44 which is permanently carried or fastened to one face of the shaft and gear housing 5, serving to hold the band in position. A suitable toggle link 45 is also pivotally connected to the stud 44 and is in turn pivotally connected at 46 to the toggle lever 47. The lever 47 has an angled end which is pivotally connected at 48 to the other end of the brake band 43. The other end of the toggle lever 47 extends in a forward direction, and connected thereto as at 49 is a link 50. Pivotally supported at 51 on a support 52 is an operating angle lever 53, one end of which is pivotally connected at 54 to the link 50, while connected to its other end is a reach rod 55, which has a conventional form of turn buckle 56, for the purpose of adjusting both sections of the reach rod. This reach rod is adapted for connection in any suitable manner, not shown, with a crank arm of the usual emergency brake rocker shaft, not shown, whereby upon rocking said shaft, the reach rod may be moved longitudinally in a forward direction, which will in turn actuate the lever 53, and thereby tighten the brake band 43. Reverse movement of the reach rod will relax tension on the lever 47, and thereby release the brake band. Obviously since either set of wheels may be driven, it is possible to brake either set thereof, since the gear 9 always remains in mesh with one or the other of the gears 40 and 41. When the gear 9 is in mesh with both gears 40 and 41, it is possible to brake all four wheels, thereby preventing the vehicle from rolling, especially if parked on an inclined road-bed.

The opposite ends of each of the forward and rear axle housings are fitted into castings 57, which depend from a bar 58. Obviously, the bar 58 and the castings 57 may be separate or integrally connected. The axle housings or tubings 28 and 29 are reinforced relatively to the bars 58 by means of the upright tubes 59 and 60, there being suitable bolts 61 and 62 passing through the tubings 59 and 60 in order to connect the parts. The bolts 61 have bearings at their upper ends, thereby constituting spring hangers 63, to which the links 64 are connected. The links 64 in turn support the forward spring 65, which in turn carries the chassis or frame.

The forward radius rods 66 are connected to suitable collars 67, which are carried by the forward tubular casing or housing 28. The rear ends of the radius rods 66 connect in the usual manner, not shown, with the forward universal joint of the drive shaft casing, thereby reinforcing the forward tubular axle casing.

Each casting 57 has an extension 69, the lower portion of which has an enlarged threaded opening 70 to receive the plug plate 71. A bearing spindle in the form of an elongated bolt 72 passes through a tubular spindle 73, which is mounted in bearings of the plate 71 and the bars 58. The tubular spindle 73 acts as a fulcrum for the hub spindle body 74, to which the usual hub plate 75 is connected. The upper end of the spindle body 74 is reduced and has keyed thereto as at 76 a spiral gear 77. A hub 78 connects the spindle body 74 and the hub plate, and secured to the hub 78 as at 79 is a beveled gear 80, which meshes with a beveled gear 81, which rotates loosely on the tubular spindle 73. Keyed at 83 with the lower portion of the body of the beveled gear 81 is a beveled gear 84. It will be noted that all four supporting wheels of the chassis are capable of being steered and driven, and in order to drive all four wheels the forward and rear axles 85 and 86 have keyed to their ends as at 86 beveled gears 87 and 88. These gears 87 and 88 mesh with the beveled gears 84, and since the gears 81 rotate loose upon the tubular spindles 73 driving power is transmitted to the gears 80, and since the latter are movable with and carried by the hubs 78 driving power is transmitted to all four wheels. As previously stated, spiral gears 77 are keyed to the upper ends of the spindle bodies, and in order to rock the spindle bodies upon the tubular spindles 73 forward and rear steering shafts 90 and 91 are mounted in bearings of the forward and rear bars 58. The opposite ends of the shafts 90 and 91 have spiral gears 92 and 93, which mesh with the spiral gears 77. Obviously, when these shafts 90 and 91 are rotated movement is transmitted to the spindle bodies 74 through the medium of the spiral gears 77 and 92 and 93, enabling the forward and rear wheels to be turned in either direction to the right or the left on an arc of 180 degrees.

A suitable oil housing 94 surrounds the spindle body 74, and so arranged as to rock therewith. A suitable bushing ring 95 fas tens in any manner into the oil housing 94 and surrounds the hub. This bushing ring carries a felt packing 96, thereby rendering the oil housing oil-proof. The extension 69 of the casting 57 receives the lower end of the oil housing 94, so that the latter may rotate axially within the former. Owing to this construction the extension 69 constitutes the lower portion of the housing. The plate plug 71 acts as a bottom of the housing, and also as a bearing for the beveled gears 81 and 84. The upper face of the plug 71 has an annular recess 97, in which the oil or lubricant may collect, and thereby keep the lower faces of the gears 81 and 84 thoroughly lubricated. The forward and rear axles 26 and 27 are mounted in bearings 98 and 99, which are disposed within the forward and rear tubular axle casings 28 and 29. The forward and rear tubular axle casings communicate with the oil housings which are carried by the spindle bodies 74, and in this way such oil that may seep between the contacting surfaces may pass from one set of wheels to the other, since the tubular drive shaft casing also communicates with the forward and rear axle casings.

Carried by the chassis is the usual steering column 100, which supports the usual steering wheel 101. The steering wheel 101 operates the usual steering shaft 102, which passes through the column. The lower portion of the shaft 102 is mounted in a bearing 103, and keyed to its lower portion below the bearing as at 104 are spur gears 105 and 106. Loosely mounted upon a stud 107 carried by the bearing 103 is an idle pinion or gear 108.

Disposed adjacent to and parallel with the column 100 is an auxiliary steering shaft 109 for the purpose of steering the rear wheels. The lower extremity of the steering shaft 102 is connected through the medium of a series of universal joints 110 and a slide connection 111 with a stub shaft 112, which is mounted in a bearing of the forward bar 58. The stub shaft 112 has a beveled gear 113 connecting with a beveled gear 114 which is carried by the shaft 90. Obviously, by moving the steering wheel 101 to the right or the left power is transmitted through the several universal and slide joints and the shaft 90 to the front wheels, owing to the spiral gear connections with the spindle bodies.

A suitable bearing 115 depends on one of the side bars of the chassis or frame for supporting the two steering rods of the shafts 102 and 109. Beyond the bearing 115, the lower end of the steering rod or shaft 109 is connected to a gear 116 by means of several universal joints 117 and a slide connection 118. The gear 116 rotates and meshes with a gear 119, which is fast to a shaft 120. This shaft 120 is mounted in bearings 121 and 122 which are carried by the forward and rear bars 58. The rear end of the shaft 120 carries a beveled gear 123 meshing with the beveled gear 124 which is carried by and movable with the rear steering shaft 91. Obviously, when the steering rod or shaft 109 is rotated in one direction or the other power is transmitted to the rear steering shaft 91, and through its spiral gear connections, the rear wheels may be turned in either direction. Obviously, the rear wheels may be turned in the same direction with the front wheels or in opposite directions, and as shown by the dotted lines in Figure 1, and as shown in the diagrammatic views, the rear wheels may move upon arcs of 180 degrees.

A bearing 124$^a$, which comprises two opposed plates 125, is carried by the upper end of the column 100. The plates 125 are bolted or otherwise secured together as shown, in order to provide a firm bearing with the steering rod 109. The steering rod where it is mounted in the bearing 104 is cylindrical, and is provided with a head at one end to prevent axial movement of the rod in one direction. This steering rod 109 between a bearing 126 and the bearing 124$^a$ is square in cross section, while the lower extremity of said rod beyond the upper face of the bearing 126 is cylindrical, so that the gears 127 and 128 may rotate freely thereon. These gears 127 and 128 mesh with the gears 106 and 108. One side of the steering rod 109 has a groove 129, in which the lower end of a locking rod 130 is slidably engaged. The lower end of this locking bar 130 acts as a key to enter the key-way 131 of the gear 128, so as to lock the gear to move with the rod 109. A rod 132 slides through the bearing 126, and its lower end engages a key-way 133 of the gear 127.

Pivotally mounted upon a stud 134 which passes transversely through the upper end of the rod 109, are the forks 135 of the lever 136. The upper end of the rod 132 pivotally connects between the forks 135 of the lever on a stud 137. When the lever 136 is moved upwardly and rearwardly on its fulcrum, the rod 132 is moved longitudinally, so that its lower end may disengage from the key-way 133, so that the gear 127 will rotate idly on the rod 109. However, when the lower extremity of the rod 132 is in engagement with the key-way 133, the gear 127 will move with the rod 109, and since the gear 127 is in mesh with the gear 106, all four wheels may operate in unison. Pivoted also upon the stud 134 is a lever 138, an extension of which carries a stud 139 to which the upper end of the bar 138 is pivotally connected. When the lever 130 is moved so as to force the lower extremity of the bar in engagement with the key-way 131, and the rod 132 is removed from engagement with the key-way 133, the rear wheels, when the steering wheel 101 is operated, may be turned in the direction as indicated in the diagrammatic view of Figure 13. When the bar 130 is removed from engagement with the key-way 131 and the bar 132 still in engagement with the key-way 133, the manipulation of the steering wheel 101 will move the four wheels in the direction shown in Figure 15. The lever 138 has an opening 140 which may register with an opening 141 formed in an ear 142 which is carried by one of the forks of the lever 136, that is, when the lever 138 is tilted upwardly and rearwardly, thereby permitting the shackle of a padlock to engage these registering openings, and thereby lock the steering mechanism. For example, when the lever 138 is moved and locked the rod or bar 130 is moved to engage the key-way 131, and the lower extremity of the bar 130 will contact with the face of the gear 127, and thereby prevent the lever 136 from being tilted upon its pivot, which in turn will prevent withdrawal of the lower extremity of the rod 132 from the key-way 133. As a result of the locking of the lever 138 the gear connection between the two steering rods 102 and 109 are locked and prevented from transmitting power to the wheels of the vehicle. The steering rod 109 has on its opposite faces depressions 143, 144, 145, and 146, to hold the rods or bars 109 and 130 in different adjusted positions, that is to say, when certain of the depressions are engaged by the nubs or protuberances 147 and 148. When the rod 132 is in engagement with the key-way 133 the nub 147 engages the depression 145. When the lever 136 is moved upwardly and rearwardly the protuberance 147 engages the depression 146. The protuberance 148 may engage either one of the depressions 143 and 144 for holding the bar 130 in either of its positions.

A suitable dust-proof housing 149 surrounds the fly wheel and brake band and is carried by the shaft and gear housing.

The rear radius rods 150 connect at their forward ends to the rear universal joint 33, while their rear ends are connected to the rear tubular supports 160. Obviously, the rear radius rods may connect direct with the rear axle housing in the same manner as the forward radius rods connect with the forward axle housing.

In Figure 16 the spiral gears 77 are mounted above the bars 58 or castings 57 and may be keyed to the tubular spindle, as shown at 151. The same key 151 also keys the tubular spindle to the spindle body, so that the spiral gear, tubular spindle and the spindle body all rotate together.

The invention having been set forth, what is claimed is:

1. In an automobile, a four wheel drive mechanism, a steering means for the front wheels, and means operatively connected with said front wheel steering means for steering the rear wheel selectively to the right or the left, and means for locking the rear wheel steering means which in turn locks the front wheel steering means, thereby locking the automobile.

2. In a running gear for motor driven vehicles including forward and rear driven wheels, a steering means for the front wheels, and means connected to and operative by said steering means for steering the rear wheels selectively to the right or the left, and means for locking the rear wheel steering means, which in turn locks the front wheel steering means for locking the vehicle.

3. In a running gear for motor driven vehicles including forward and rear wheels, and means for selectively driving the forward or rear wheels, means for steering the front wheels, and means connected to and operated by the front wheel steering means for steering the rear wheels selectively to the right or the left, and means for locking the rear wheel steering means, which in turn locks the front wheel steering means for locking the vehicle.

4. In a running gear for motor driven vehicles including forward and rear wheels, means for driving all four wheels and including a shifting mechanism for selectively driving the forward and rear set of wheels, means for steering the forward wheels, and means operatively connected to and actuated by the forward wheel steering means for steering the rear wheels selectively to the right or left, means for locking the rear wheel steering means, which in turn locks the forward wheel steering means through the medium of its operative connections therewith.

5. In a running gear for motor driven vehicles including forward and rear wheels, means for driving both sets of wheels, said driving means comprising members to be driven, a driving element, and means permanently in operative connection with said element and being shiftable in and out of gear with one or the other of said members for selectively driving either set of wheels, means for steering the forward wheels, and means operatively connected to and operated by the forward wheel steering means for steering the rear wheels selectively to the right or the left.

6. In a running gear for motor driven vehicles, a frame, front and rear wheels therefor, axially alined members to be driven and operatively connected with the front and rear wheels, said members having gears, a driving element, and a device permanently in mesh with the driving element and shiftable into and out of mesh with one or the other of the gears of the members for selectively driving the front or rear wheels, means for steering the front wheels, and means operatively connected with the front wheel steering means for steering the rear wheels selectively to the right or the left.

7. In a running gear for motor driven vehicles, a frame, front and rear wheels therefor, axially alined members to be driven and operatively connected with the front and rear wheels, said members having gears, a driving element, and a device permanently in mesh with the driving element and shiftable into and out of mesh with one or the other of the gears of the members for selectively driving the front or rear wheels, means for steering the front wheels, and means operatively connected with the front wheel steering means for steering the rear wheels selectively to the right or the left, and means for locking the rear wheel steering means, which in turn locks the front wheel steering means for locking the vehicle.

8. In combination with a four wheel drive mechanism for motor driven vehicles, means for steering the front wheels including a main steering rod, an auxiliary steering rod for the rear wheel, a chain of gears connecting the main and auxiliary steering rods for driving the latter by the former, and means for connecting certain of the chain of gears selectively with the auxiliary steering rod for steering the rear wheels selectively to the right or left, said last mentioned means including a tiltable element and means for locking the same, thereby locking the auxiliary steering rod which in turn locks the main steering rod for locking the vehicle.

9. In a motor driven vehicle including a four-wheel drive and provided with a well known steering column operatively connecting with and steering the front wheels, a second steering column parallel with the first column and operatively connected to the rear wheels, means operatively connecting the two columns for steering the rear wheels simultaneously with the front wheels, said connecting means between the two columns including loose members on the latter column, and means for changing the direction of rotation of the loose members for selectively steering the rear wheels in either direction with respect to the front wheels.

10. In a motor driven vehicle including a four-wheel drive and provided with a well steering column operatively connecting with and steering the front wheels, a second steering column parallel with the first column and operatively connected to the rear wheels, means operatively connecting the two columns for steering the rear wheels simultaneously with the front wheels, said connecting means between the two including loose members on the latter column, means for changing the direction of rotation of the loose members for selectively steering the rear wheels in either direction with respect to the front wheels, a single member for turning the first steering column, and means for locking the loose members, thereby locking the front and rear wheels against steering movements.

11. In a steering mechanism for a four-wheel drive, the combination with a well known steering column with a single steering wheel for steering the front wheels, a second steering column for steering the rear wheels, and means for permitting operative connection and disconnection of the columns for controlling the latter column by the former, and means for retaining the latter inoperatively fixed and permitting the former to operate independently.

12. In a steering mechanism for a four-wheel drive, the combination with a well known steering column with a single steering wheel for steering the front wheels, a second steering column for steering the rear wheels, and means connecting the two columns whereby the latter is controlled by the former, said last named including mechanism for permitting the second steering column to change its direction of rotation in either direction with respect to the steering rotation of the first column.

13. In a steering mechanism for a four-wheel drive, the combination with a well known steering column with a single steering wheel for steering the front wheels, a second steering column for steering the rear wheels, and means connecting the two columns whereby the latter is controlled by the former, said last named means including mechanism for permitting the second steering column to change its direction of rotation in either direction with respect to the steering rotation of the first column, the construction and arrangement of the means for causing the change in rotation of the second column being such as to lock said last named means for locking both columns.

14. A well known steering column including a single steering wheel and provided with gear members fast therewith, a second steering column in parallelism therewith and provided with loose gear members operatively connecting with the first members, and means carried by the second column and shiftable in engagement with either one of said loose gear members for causing a rotation of the second column respectively in either direction with respect to the first column.

15. A well known steering colunm including a single steering wheel and provided with gear members fast therewith, a second steering column in parallelism therewith and provided with loose gear members operatively connecting with the first members, means carried by the second column and shiftable in engagement with either one of said loose gear members for causing a rotation of the second column respectively in either direction with respect to the first column, said shiftable means being engageable with both of said gear members simultaneously, and means for locking said shiftable means, thereby locking both columns against movement.

16. In an automobile, a frame, forward and rear wheels supporting the frame, means for selectively driving either the forward or rear wheels or both sets together, said wheels being movable to 90° in either direction, and a commercially known type of steering mechanism associated with an additional steering mechanism, said steering mechanisms being respectively connected to the forward and rear wheels for selectively steering them in the same or opposite directions and steering them simultaneously on an arc of 90°.

17. In an automobile, a frame, forward and rear wheels supporting the frame, means for selectively driving either the forward or rear wheels or both sets together, said wheels being movable to 90° in either direction, and a commercially known type of steering mechanism associated with an additional steering mechanism, said steering mechanisms being respectively connected to the forward and rear wheels for selectively steering them in the same or opposite directions and steering them simultaneously on an arc of 90°, and means for locking the rear wheel steering means, which in turn locks the front wheel steering means for locking the vehicle.

In witness whereof the inventor's signature is hereunto affixed.

RICHARD H. LEWIS.